Patented July 29, 1930

1,771,478

UNITED STATES PATENT OFFICE

WILLIAM H. ALTON, OF NEW YORK, N. Y., ASSIGNOR TO R. T. VANDERBILT COMPANY, INCORPORATED, OF NEW YORK, N. Y., A CORPORATION OF NEW YORK

PROCESS OF TREATING CLAY

No Drawing. Application filed July 24, 1928. Serial No. 295,125.

This invention relates to improvements in the treatment of clays and particularly secondary clays of the kaolin type, such as those common to the States of North and South Carolina and Georgia.

These clay deposits occur in the form of veins underground. The overburden, amounting, for example, to around forty feet, is removed to uncover the vein of clay which may be, for example, around sixteen feet thick. The clay varies in color and in grit content from top to bottom, the best white clay being on top, the next layer being somewhat darker in color and containing more grit, and the bottom layer usually being still darker and containing still more grit. The grit occurs in the clay in the form of fine particles of quartz, together with flakes of mica.

The clay has to be freed from grit before it can be used in the manufacture of paper, etc., because no matter how finely the grit is ground by machinery into the body of the clay the quartz always remains as microscopic grit to weaken the fabric and the mica shows in the finished product as a shining speck or is liable to drop out of the paper or film, leaving tiny holes.

In the ordinary process of mining and preparing clay the method heretofore resorted to has been that of adding a large amount of water to the clay so as to soften it to a point where it will disintegrate and leave free the particles of grit to which it has been adhering. The clay has been mixed with about nine times as much water and made into a thin slurry, and this slurry has then been passed through a series of troughs with cleats or pockets across the bottom called "riffles" in which the particles of grit are caught due to their greater specific gravity while the clay itself flows over the riffles and it is collected in large settling tanks or vats and allowed to settle after which the water is siphoned off, leaving a layer of clay mud. This clay mud requires several days or weeks to dry sufficiently for handling in a dry house after which it must be further dried before it is packaged for delivery to the consumer. While this method is adequate in separating the grit from the clay it is wasteful and expensive, requiring first the mixing of the clay with a large amount of water and subsequent drying out of the water with artificial heat. The present invention provides an improved process by which the grit can be effectively separated from the clay in a simple and inexpensive manner and without the necessity of mixing the clay with a large amout of water and subsequently separating the clay from the water and drying it.

I have found that the grit-bearing clay, after mining and air-drying in lump form in ordinary dry sheds, can be subjected to rough crushing, for example, between rolls or in a Jeffrey mill, and then subjected to drying in a rotary dryer, and that the resulting clay can be effectively separated, without further grinding, in a selective type of air separator.

The clay is commonly mined with a pick and shovel or with electric spades by hand and comes out in the form of wet, sticky lumps. Some of these lumps are grit-free and require no special treatment to remove grit therefrom. The lumps which contain grit are separately collected and these lumps are treated by the present process. The large lumps of clay are first subjected to atmospheric or air drying by allowing them to stand several days in a "dry shed". The air-dried clay is then subjected to disintegration to break up the large lumps into a mixture of fine clay and pellets. A mill such as a cage mill or hammer mill or crushing rolls can be used, taking care not to exert an abrading or grinding action on the clay. By regulating the crushing operation and avoiding an abrading or grinding action the grit is left in the form of grit-carrying pellets, each pellet apparently containing a particle of grit with adhering clay. The clay adhering to or adjacent the grit particles appears to be denser or otherwise more resistant to crushing so that a large part of the clay can be crushed to a fine state without crushing the grit-carrying pellets to a size finer than the head of a pin and without reducing the size of the grit particles themselves.

When this mixture of free clay and grit carrying pellets is passed through a dryer, such as a fixed or rotary artificial dryer, in which the moisture is reduced, for example, to around 1%, the resulting dried mixture will be made up of around half or more of free fine clay and half or less of grit carrying pellets.

I have found that this selectively crushed and dried mixture can be effectively treated in a selective type of air separator to separate directly a large part of the clay in the form of free, fine clay which requires no subsequent grinding or drying or other treatment and which can be directly marketed.

Accordingly, in the process of the present invention, I subject the air-dried clay to a regulated rough crushing and to a subsequent drying and thereby produce a mixture of fine clay and of grit-bearing pellets, and I subject this mixture to an air separation treatment in a selective type of air separator and I thereby separate and recover directly a large part of the clay in a form ready for the market and free from grit.

There remains the grit-carrying pellets, together with some of the admixed clay and with a considerable amount of clay adhering to the pellets. This product can then be subjected to a further treatment to separate the adhering clay from the grit particles. This further disintegration should be carried out in disintegrators or beaters which will serve to free the clay from the grit particles without breaking up the grit particles. This further crushing or beating can be more readily carried out after the large amount of fine clay has been separated in the previous separating step of the process, since the grit-bearing pellets will not have such a large amount of fine clay admixed with them and beaten up with them during their disintegration. The disintegration can therefore be more readily carried out and regulated.

After the further disintegration and the freeing of the grit particles from adhering clay the mixture can be subjected to a further air separation treatment in a selective type of separator and a large part of the admixed fine clay separated from the grit particles, which, because of their heavier weight and because they have not been ground up into fine particles, can be separated from the fine clay in such a selective type of air separator.

The grits will still contain more or less clay admixed therewith. Where the amount of clay is not too great or where the grit-bearing clay is not desired, this product can be discarded; or it can be ground up with the grits in it to form a cheaper grade of clay for use where fine grit particles are unobjectionable, as in certain paints.

It will be appreciated that the grit admixed with clay is itself in a finely divided state. In one sample, for example, the isolated grit was of such a fineness that practically all of it passed through a 10-mesh screen and around 80% of it passed through a 60-mesh screen, while none of it passed through a 325 mesh screen. While I do not wish to limit myself by any theoretical explanation as to the manner in which these grit particles are distributed throughout and associated with the clay, yet the character of the grit-bearing pellets, formed by partial disintegration of the clay, indicates that the clay may have been adsorbed in a denser condition immediately adjacent the grit particles so that the clay adheres somewhat more firmly to the grit particles than it does to itself away from the grit particles. Whatever the explanation may be, I have found that advantage can be taken of the adherence of the clay to the grit particles and the air-dried clay roughly crushed to give a mixture which after drying is made up of fine clay and grit-bearing particles which can then be readily separated in an air separator in the manner above described.

In so far as I am aware, it is broadly new to subject clay to a regulated crushing followed by drying such that the clay is made up of fine particles of clay and grit-bearing pellets, and to separate the fine clay from the grit-bearing pellets by a selective air separation treatment.

The air separation treatment is distinguished from air blasts, and is a selective separation such as is accomplished in the Gayco dry centrifugal separator or in the Sturtevant selective type of separator.

It will thus be seen that the present process is one of marked simplicity. The wasteful and expensive process of washing is eliminated, and the clay can easily and economically be treated. The only drying of the clay required is air drying followed by a further drying to remove the remainder of the normally appearing moisture from the clay, that is, the free moisture without, however, removing the water of hydration. A single rough crushing of a regulated character is sufficient so that the crushed and dried clay can be directly separated to give around half or more of the clay in a fine grit-free condition ready for the market. The grit-bearing pellets remaining after the separation of this fine clay can then be further disintegrated and there will be less material to handle during the disintegration, and the disintegration can be more readily carried out because of the removal of a large part of the fine clay originally admixed therewith. This further crushing of the pellets can also be regulated to avoid or minimize disintegration of the individual grit particles and the mixture of clay and grit can then be subjected to a further selective air separation treatment to recover an additional amount of fine clay in a substantially grit-free condition, leaving a grit-bearing clay which if desired can be ground up with the grits in it for special purposes.

I claim:—

1. The method of treating grit-bearing clay, which comprises subjecting the clay lumps to a regulated crushing and drying to produce a clay mixture containing fine clay particles and grit-bearing pellets retaining a portion of clay, and subjecting such mixture to a selective air separation treatment to separate the fine clay from the grit-bearing pellets.

2. The method of treating grit-containing clay, which comprises air-drying the clay, subjecting the air dried clay to a regulated disintegration and drying to give a disintegrated and dry clay mixture containing a large part of the clay in the form of fine grit-free particles admixed with grit-bearing pellets retaining a portion of clay, and subjecting the resulting mixture to an air separation treatment to separate the fine clay in a substantially grit-free state from the grit-bearing pellets.

3. The method of treating clay which comprises mining and air drying the clay, disintegrating the air dried clay in a regulated manner to give a mixture of fine clay and clay-bearing pellets retaining a portion of clay, drying the disintegrated clay, and subjecting the dried mixture to a selective air separation treatment to separate a large part of the clay as fine grit-free clay particles from the grit-bearing pellets.

4. The process according to claim 1 in which the mixture of clay and clay-bearing pellets, from which a large part of the fine clay has been separated, is subjected to a further disintegration to separate adhering clay from the particles of grit in the grit-bearing pellets, and the resulting mixture of clay and grit particles is then subjected to a further air separation treatment to separate additional finely divided clay from the grit particles.

5. The further improvement in the process of claim 1 in which the mixture of grit particles and admixed clay is ground up together to give a grit-bearing clay containing fine grit particles.

6. The method of treating grit-bearing clay, which comprises subjecting the clay lumps to a regulated crushing and drying to produce a clay mixture containing fine clay particles and grit-bearing pellets retaining a portion of clay, and subjecting such mixture to a separation treatment to separate the fine clay from the grit-bearing pellets.

In testimony whereof I affix my signature.

WILLIAM H. ALTON.